(12) United States Patent
Aronson

(10) Patent No.: US 9,166,981 B2
(45) Date of Patent: *Oct. 20, 2015

(54) FULL SPECTRUM CYBER IDENTIFICATION DETERMINATION PROCESS

(71) Applicant: Jeffry David Aronson, San Antonio, TX (US)

(72) Inventor: Jeffry David Aronson, San Antonio, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/316,196

(22) Filed: Jun. 26, 2014

(65) Prior Publication Data

US 2014/0310790 A1 Oct. 16, 2014

Related U.S. Application Data

(63) Continuation of application No. 13/784,277, filed on Mar. 4, 2013, now Pat. No. 8,769,649, which is a continuation of application No. 13/688,925, filed on Nov. 29, 2012, now Pat. No. 8,434,136.

(51) Int. Cl.

| | |
|---|---|
| *H04L 29/06* | (2006.01) |
| *G06F 21/32* | (2013.01) |
| *G06F 21/40* | (2013.01) |
| *G06Q 10/10* | (2012.01) |

(52) U.S. Cl.
CPC ............... *H04L 63/10* (2013.01); *G06F 21/32* (2013.01); *G06F 21/40* (2013.01); *G06Q 10/10* (2013.01)

(58) Field of Classification Search
CPC ........................................................ G06F 21/30
USPC ............................................................. 726/7
See application file for complete search history.

(56) References Cited

U.S. PATENT DOCUMENTS

| | | | |
|---|---|---|---|
| 6,219,639 B1 | 4/2001 | Bakis | |
| 6,421,453 B1 | 7/2002 | Kanevsky | |
| 7,278,025 B2 * | 10/2007 | Saito et al. | 713/185 |
| 7,442,807 B2 | 10/2008 | Lundstedt | |
| 8,090,945 B2 * | 1/2012 | Singhal | 713/168 |
| 2004/0223631 A1 | 11/2004 | Waupotitsch et al. | |
| 2007/0290800 A1 | 12/2007 | Fuller | |
| 2011/0221567 A1 | 9/2011 | Lehnert | |
| 2012/0102540 A1 | 4/2012 | Aronson | |

OTHER PUBLICATIONS

International Search Report regarding corresponding PCT Application No. PCT/US2012/067028, dated Feb. 5, 2013.

* cited by examiner

*Primary Examiner* — Longbit Chai
(74) *Attorney, Agent, or Firm* — John A. Fortkort; Fortkort & Houston P.C.

(57) ABSTRACT

A full spectrum cyber identification determination process for accurately and reliably determining and reporting any identification determination from a full spectrum of possible cyber identification determinations. Utilizing cyber resources and predetermined criteria for providing cyber identification determinations for at least one unidentified subject of an observation, the process: provides identification determinations for any possible subject of an observation; provides for the utilization of any selected attainable level of accuracy, up to, and including 100% accuracy; provides for single, intermittent, and constant identification determinations; utilizes any available cyber resources; interacts with utilized cyber resources to provide any possible function and/or observation; recognizes characteristics from observations and then utilizes recognized characteristics for comparing and/or determining; provides and utilizes a standard set of designations for representing all aspects of the process; utilizes useful information and/or outcomes from comparing for making identification determinations; and, reports on any aspect of the process at any time.

20 Claims, 1 Drawing Sheet

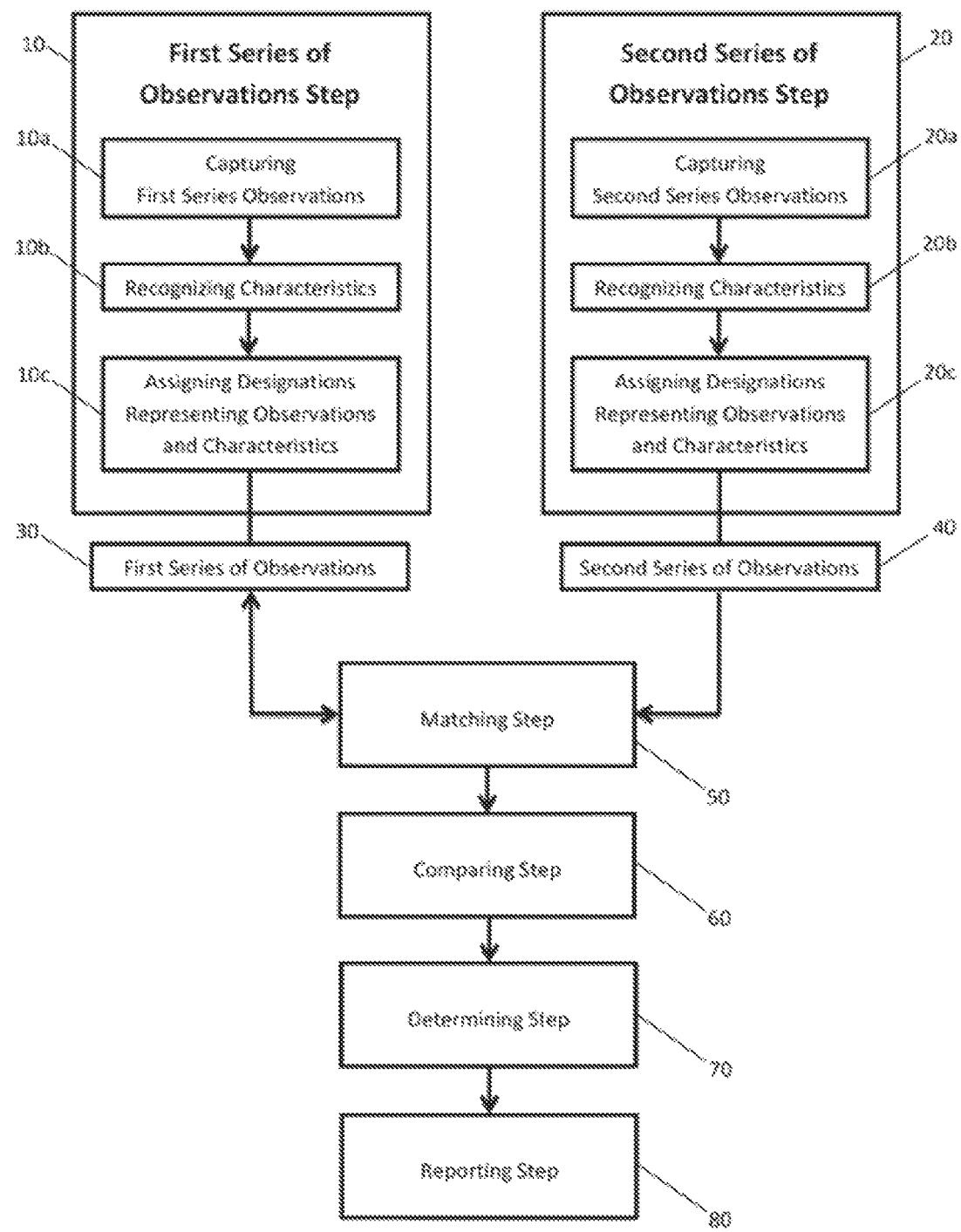

FULL SPECTRUM CYBER IDENTIFICATION DETERMINATION PROCESS

CROSS-REFERENCE TO RELATED APPLICATIONS

This application is a continuation of U.S. patent application Ser. No. 13/784,277, filed Mar. 4, 2013, which will issue as U.S. Pat. No. 8,769,649 on Jul. 1, 2014, which is a continuation of U.S. patent application Ser. No. 13/688,925, filed Nov. 29, 2012, now U.S. Pat. No. 8,434,136.

BACKGROUND

The present disclosure pertains to a full spectrum cyber identification determination process, more particularly a full spectrum cyber identification determination process that utilizes observations, information, predetermined criteria, and cyber resources for providing identification determinations from a full spectrum of cyber identification determinations. Throughout this disclosure, the term "cyber" shall generally be understood to refer to utilizing non-biological processing of programming. Further definition involving the use of the term follows below.

There exists a present need to achieve a much higher level of cyber security than can be provided by the entire body of prior art cyber security measures.

I've found that there are two primary underlying reasons why prior art cyber security measures do not meet present needs, and they are:

1. the prior art's inability to accurately grant and deny any specific person access to cyber resources of any kind; and,
2. the prior art's inability to accurately hold any one person directly and personally accountable for his or her own cyber activities and cyber resources.

I also find that both of the above are due to prior art's inability to accurately identify even one single person when he or she is utilizing cyber resources.

When I combine the previous findings, I further find:

1. it is not possible to accurately deny others access to your cyber resources if your own cyber resources cannot accurately determine that you and you alone are yourself; and
2. if cyber resources cannot accurately identify who you are, then it is not possible for others to accurately hold you directly accountable for your own cyber activities and cyber resources.

Thus, I find utilization of accurate cyber identification determinations of a person to be an important step in a process for providing not only reasonable levels of cyber security, but also the highest levels of cyber security, cyber safety, and cyber privacy that can be attained.

Additionally, we live in a technologically interconnected world where the vast spectrum of available cyber resources is ever widening. Over time, our technologically interconnected world is destined to provide every possible cyber resource that humanity could ever want or need. Included in those cyber resources will be a full spectrum cyber identification determination process that provides not only the presently needed 100% accurate cyber identification determinations of a person, but also every other cyber identification determination our world could ever want or need. A further discussion of this universal concept is disclosed in my co-pending Patent Application PCT/US2011/056931, entitled "Single-Point-of-Access Cyber System", which is incorporated herein by reference in its entirety.

With this understanding, I find there is a present need for a cyber identification determination process that:

a. provides identification determinations of a known person and an unidentified person being the same person at any attainable level of accuracy, including 100% accuracy;

b. utilizes any number of observed, unique biological characteristics of a known person and/or an unidentified person for making identification determinations;

c. performs observations of a person who is not consciously engaged in the identification determination process;

d. provides single, intermittent, and constant identification determinations of a person;

e. performs observations where the unidentified person repeats a portion of a randomly selected, previously recorded observation of the known person;

f. utilizes any available observation of a subject of an observation for making identification determinations;

g. provides and utilizes an all-inclusive, standard set of designations for accurately and consistently representing any aspect of the process;

h. provides absolute security and privacy for all information and resources that are utilized for providing cyber identification determinations;

i. utilizes any useful criteria for observing, recognizing, matching, comparing, determining, reporting, or, any other aspect of the identification determination process;

j. utilizes observations made by others for providing identification determinations;

k. utilizes useful information of any type, from any source for providing identification determinations;

l. utilizes more than one recognized characteristic for determining;

m. utilizes comparisons of more than one matching characteristic to achieve a predetermined attainable identification determination; and, n. is a single system that is scalable in size and utilized resources; these utilized resources may be configured to provide for any needs in a range from needs for a self-contained process for utilization with the smallest of identification determination needs, to needs for a self-contained process that provides a full spectrum of identification determination resources that are utilized to provide a full spectrum of identification determination needs.

I find that a technologically interconnected world that is capable of providing every possible cyber resource humanity could ever want or need can only be built upon the foundation of a secure and safe cyber environment.

I also find that utilization of accurate cyber identification determinations of a person is an indispensable step in providing a secure and safe cyber environment.

BRIEF DESCRIPTION OF DRAWING FIGURES

FIG. 1 illustrates a simple flowchart of one embodiment of the process.

DETAILED DESCRIPTION OF EMBODIMENTS

Definitions

Absolutely Unique: occurring at a ratio of one to the total number of process-wide identity files for each different person.

And/or: either or both of "and" and "or."

Biological characteristic: any characteristic of a biological organism, including a person, that can be observed and reported upon.

Unique biological characteristic: any single observable biological characteristic of a person or any combination of observable biological characteristics of one person that can be considered to be unique to the observed person.

Capture/capturing: the use of cyber resources for acquiring and then recording cyber based observations.

Characteristic: a recognized aspect of an observation and/or a combination of recognized aspects of an observation that can be assigned a designation and further utilized.

Characteristics: at least one characteristic.

Constant/constantly: occurring at any selected frequency that provides for continuous identification determinations.

Criteria: a group of at least one choice of options.

Cyber: anything such as devices, programming, processes, or files that utilize non-biological processing of programming in any way.

Full spectrum: full available spectrum.

Identification determinations: at least one identification determination.

Known person: the person who is the subject of a first series of observations.

Recognized: any aspect of an observation that is identified for further utilization.

Recording: creating a cyber record or a cyber file

Series: a group of at least one.

Unidentified person: one single person who is a subject of a second series of observations; a person who has not been determined, utilizing predetermined criteria, to be the same person as a known person.

Unique: occurring at a selected ratio other than the ratio of absolutely unique.

Overview

The following brief overview pertains to this cyber identification determination process in general; however, it also pertains, in part, to the more specific utilization of the process for providing accurate and reliable identification determinations of a person.

I therefore introduce you to the full spectrum cyber identification determination process of the present disclosure, a cyber identification determination process that accurately and reliably provides cyber identification determinations of a person from a full spectrum of cyber identification determinations, thereby providing the foundation upon which to build a secure, safe, and private technologically interconnected world.

Additionally, through wise utilization of this accurate and reliable cyber identification determination process, cyber environments may soon change from environments of unparalleled chaos to a unified and orderly technologically interconnected environment that provides all users with reasonable levels of cyber security, cyber safety, and cyber privacy.

The following is a list of a portion of the resources from the full spectrum of resources that are provided by the cyber identification determination process of the present disclosure:

a. identification determinations of a full spectrum of subjects of cyber identification determinations;

b. identification determinations that fill a full spectrum of needs for cyber identification determinations;

c. identification determinations that are provided utilizing a full spectrum of attainable levels of accuracy including 100% accuracy;

d. identification determinations that utilize cyber resources from a full spectrum of useful cyber resources;

e identification determinations that utilize information from a full spectrum of useful information;

f. identification determinations that utilize observations from a full spectrum of useful observations;

g. identification determinations that utilize unique biological characteristics of a person from a full spectrum of unique biological characteristics of a person who is the subject of an observation;

h. identification determinations that utilize predetermined criteria from a full spectrum of useful criteria;

i. identification determinations that utilize standard designations for accurately and reliably representing any aspect of the identification determination process;

j. identification determinations that are provided one single time, intermittently, and constantly;

k. utilization of the process itself to accurately grant and deny access to the cyber resources that are being utilized by the process;

l. absolute security and privacy for all cyber identification process information and resources;

m. observations of a person where the subject of an observation may be any in a range from not being consciously engaged in the observation to being consciously engaged and participating in the observation;

n. scalable for configuring as a self-contained process that provides for any in a range from the least complex of all cyber identification determination needs to the most complex and comprehensive of all cyber identification determination needs;

o. ease of use in all phases of operations;

p. persistence in trying to achieve attainable selected identification determinations;

q. utilization of one or more of an incalculable number of observed unique biological characteristics of a person for providing identification determinations;

r. alteration of operations of the process itself for aiding in attaining any selected achievable identification determination;

s. utilization of useful information and useful observations from any source;

t. utilization of a unique combination of simultaneously occurring observed biological characteristics for providing identification determinations of a person; and, u. utilization of a unique combination of observed biological characteristics that occur over any period of time for providing identification determinations of a person.

Proper utilization of a 100% accurate cyber identification determination of a person process can, for the first time ever, provide the world with the benefits of a secure, safe, and private technologically interconnected cyber environment.

Among the many benefits that may be derived from the utilization of this process for providing a full spectrum of cyber identification determinations is its ability to determine and report on any indicated measure of probability that exists of an unidentified person being the same person as a specific known person. At one end of the full spectrum of these identification determinations is the determination that an unidentified person absolutely is the same person as a specific known person, and at the other end of the spectrum is the determination that an unidentified person absolutely is not the same person as a specific known person.

Through the utilization of cyber resources and predetermined criteria, the process provides its identification determinations by comparing an unidentified subject of an observation with a known subject of an observation.

The process utilizes predetermined criteria for every aspect of the process where criteria can be used.

The process provides and utilizes a standard set of designations for representing all observations, any characteristics, and any other aspect of the process.

As shown in FIG. 1, utilizing the process, cyber resources, and predetermined criteria for providing cyber identification determinations of a person:

observations for a first series of observations are captured 10*a*, during a first series of observations step 10, characteristics from the observation are recognized 10*b*, assigned designations 10*c*, and then the designations representing the characteristics and the observation are included in the first series of observations 30, which represents the observed cyber identity of a known person;

a call for at least one selected cyber identification determination initiates a cycle of this process;

the process captures observations 20a, of a selected unidentified person, during a second series of observations step 20, characteristics from the observation are recognized 20b, assigned designations 20c, and then the designations representing the characteristics and the observation are included in the second series of observations 40;

the process interacts with utilized cyber resources to control the operations of those resources for capturing any possible observations and also for providing any useful cyber resource;

any step of the process, or any portion thereof, may be performed in any order or sequence;

in any usable order or sequence, utilizing all or any part of the following, the process may:

a. utilize useable observations and information from any source;

b. determine and utilize a level of accuracy;

c. determine and utilize a measure of adequacy of available resources;

d. capture observations for a first series of observations or a second series of observations;

e. recognize usable characteristics from observations;

f. utilize recognized characteristics from any observation;

g. utilize at least one unique biological characteristic for providing identification determinations of a person;

h. assign designations to recognized characteristics;

i. determine which, and the order in which recognized characteristics will be utilized for comparing and/or determining;

j. match observations and recognized characteristics from a second series of observations, during a matching step 50, with corresponding comparable observations and recognized characteristics from a first series of observations;

k. determine and provide conclusions as to an indicated measure of comparison between the characteristic from the second series of observations and the characteristic from the first series of observations during a comparing step 60;

l. select which conclusions from comparing will be utilized for determining;

m. utilize conclusions from comparing and/or information for providing cyber identification determinations;

n. provide identification determinations including determinations of an indicated measure of probability of a known person and a unidentified person being the same person during a determining step 70; and, o. report on any aspect of the process during a reporting step 80.

Additionally, based upon predetermined criteria, the process may be persistent in attempting to attain an attainable identification determination. As an example, should a determination based upon conclusions from comparing a first characteristic of a person not result in the process determining a selected attainable determination goal, then the process may continue the comparing and determining until any attainable selected identification determination goal is achieved.

And, should a determination based upon conclusions from comparing all available useful characteristics of the unidentified person not result in determining an attainable selected identification determination goal, then the process may perform at least one additional observation of the unidentified person to add to the second series of observations.

The process may select a portion of a first series of observations to be repeated by an unidentified person for inclusion in the second series of observations.

Further, the process may alter the operations of any cyber resources utilized for capturing observations in order to capture observations that are most likely to aid in the process providing an attainable selected identification determination.

Description

Disclosed herein is a process that merges the future with the present. In order to have a full understanding of the present disclosure you must also have an understanding of my vision of a technologically interconnected future, which is as follows.

We live in a technologically interconnected world where vast cyber resources presently exist. Within this technologically interconnected world, we utilize cyber resources from a full spectrum of available cyber resources. This full spectrum of available cyber resources is ever widening, and, over time, our technologically interconnected world is destined to provide every possible cyber resource that humanity could ever want or need. When that time comes, the entire body of cyber resources will include and rely heavily upon a cyber identification determination process such as the full spectrum cyber identification determination process of the present disclosure, a cyber identification determination process that provides not only 100% accurate identification determinations of a person, but also every cyber identification determination our world could ever want or need.

To more fully understand implications of the utilization of my present disclosure of a cyber identification determination process, it is helpful to see its relationship to my pending patent application PCT/US2011/056931, entitled, "Single-Point-of-Access Cyber System."

The core operations of the process may best be disclosed through a detailed example of the utilization of the process for the purpose of providing a single selected identification determination that an unidentified person and a known person absolutely are the same person. One of many predetermined criteria utilized for the performing of this cycle of the utilization of the process is that the full resources that are available to the process should be utilized in any way possible to persistently work towards accomplishing the selected achievable identification determination.

In one scenario, a "known person" owns a portable computer. This process is utilized by the known person for exclusively granting only the known person access to further use of his or her portable computer's resources. The portable computer runs the programming of the known person's personally configured and built cyber identification determination process. In addition, the portable computer has a microphone and a camera that the process may control the adjustable operations of.

The process utilizes observations of the known person that come from the vast collection of observations that make up the known person's first series of observations. The first series of observations of the known person is exclusively made up of observations that include the known person as a subject of the observation. The first series of observations represents the cyber identity of a known person.

A cycle of the utilization of the process is initiated by an unidentified person requesting use of the known person's portable computer.

Every aspect of the operation of the process utilizes predetermined criteria. Criteria from a full spectrum of criteria may be predetermined by the known person, or criteria may be predetermined as an integral part of the operations of the cyber resources that were selected for use, or criteria may be predetermined as a part of the operations of the process, or criteria may be predetermined utilizing any other means for selecting criteria, or any combination thereof Criteria is a selected choice of who, when, where, what, why, or how as each relates to any aspect of the process and its operations. Providing a choice of any possible criteria, and, any criteria being possible, may well be the most important features that cyber resources have to offer. And, this cyber identification determination process takes full and best advantage of this particular cyber feature by providing any user with a choice of selection of any selectable aspects of his or her utilization of the process.

In the instance of this cycle of the utilization of the process, the process, utilizing predetermined criteria, utilizes the computer's camera to capture an image of the unidentified person. The process, again using predetermined criteria, utilizes the zoom feature of the camera to closely frame an image of only the face of the unidentified person in order to provide an observation that would be most likely to aid in achieving the selected attainable identification determination goal.

As a part of either series of observations, utilizing cyber resources and predetermined criteria, the process recognizes useful characteristics of any kind from the observations.

The process provides and utilizes a standard set of designations for accurately and reliably representing any aspect of the process and its operations.

Utilization of one standard set of designations is an indispensable part of accurately, reliably, and consistently providing identification determinations, while utilizing any available observation or cyber resources from any place on the planet. Also included in the process is the strategy of providing, on a worldwide basis, extremely consistent and accurate assignments of standard designations to every recognized aspect of each and every observation and characteristic.

Designations that accurately and reliably represent the observation, including designations representing the captured image of the unidentified person's face, are assigned and then included in a second series of observations for utilization in this cycle of the process. In addition, designations are accurately and consistently assigned, according to a process standard, so that designations representing observations and recognized characteristics from either series of observations may be universally utilized across the entire technologically interconnected cyber environment where the process is utilized.

The process utilizes cyber resources and predetermined criteria for matching designations representing the observation and characteristics from the second series of observations with designations representing at least one comparable observation of a known person from that person's own first series of observations.

In the instance of this cycle of the utilization of the process, predetermined criteria call for selecting and then utilizing one or more comparable observations from the first series of observations of the known person. Further, the one or more selected observations should be the most likely of all available observations to aid in accurately achieving the attainable selected identification determination goal.

Through the incredible speed and power of the operations of cyber resources, any large number of criteria can be collectively or selectively utilized for any aspect of the operations of this cyber identification determination process.

In the instance of this cycle of the utilization of the process, predetermined criteria utilize time, date, temperature, light sources, light levels, the portion of the unidentified person that was observed, and clarity of observation for matching the observation of the unidentified person with at least one comparable observation from the first series of observations of the known person.

The process provides final identification determinations for many aspects of each observation at the time when designations are assigned to recognized characteristics. For example, a final identification determination may be provided that a person who was the subject of an observation had red hair, or hazel eyes, or a particular geometry and ratio of movement between joints in a finger while opening or closing, or any other characteristic.

Further, when utilizing an observation that has more than one person as a subject of the observation, the process may exclude from further identification determinations any person who is a subject of the observation who has been determined to have hair that is not red and/or eyes that are not hazel. Also, based upon predetermined criteria, an unidentified person may be determined to absolutely not be the same person as the known person if it was determined that the unidentified person did not have red hair and/or hazel eyes.

Utilizing cyber resources and predetermined criteria, matched observations of the unidentified person and the known person are compared by the process. Any predetermined criteria may be utilized by the process for any aspect of comparing.

Utilizing cyber resources and predetermined criteria, conclusions from comparing, along with any useful information, may be utilized by the process for making identification determinations. Any predetermined criteria may be utilized by the process for any aspect of its making cyber identification determinations.

In the instance of this cycle of utilization of the process, the unidentified person is wearing large dark glasses that prevent the process from utilizing any comparison from the entire area of their eyes. Also, the unidentified person is wearing a hat that covers the area where the known person has a small scar crossing a pea-sized birthmark; therefore, this very unique biological characteristic of the known person cannot be utilized for making an identification determination.

In the instance of this cycle of the utilization of the process, conclusion from comparing a first set of matched characteristics did not provide an identification determination that met the identification determination goal of this cycle of the process. So, following predetermined criteria, the process continues to utilize conclusions from comparing of characteristics until the goal of this cycle of the process is attained, or until there are no further conclusions from the comparing to utilize.

The latter being the case in this cycle of utilization of the process, and taking into consideration that the unidentified person is wearing a hat and dark glasses, then the process selects utilization of a further observation of the unidentified person presenting that person's fully opened left hand to the computer's camera, fingernails facing the camera, then slowly closing the hand and opening it again fully.

The unidentified person, still wanting to gain access to the resources of the known person's computer, complies with the request from the computer's image display screen. The process operates the zoom on the computer's camera to provide the optimum captured observation for utilization with this cycle of the process.

In this instance, the process utilizes comparing of still images, geometry of the movement, and changes in images of the hand and fingers that occur with movement for providing identification determinations.

The selected repeated observation provides an overabundance of unique biological characteristics that can be utilized for making an identification determination, far more than are needed for determining, with 100% accuracy, that the unidentified person and the known person absolutely are the same person. Just a portion of the characteristics that were recognized from the opening and closing of a single finger from this observation would suffice for making the selected determination for this cycle of the utilization of the process.

The selected cyber identification determination having been attained, then, utilizing cyber resources and any predetermined criteria for any aspect, the process reports the identification determination.

In the instance of this cycle of the utilization of the process, the determination is reported to a history the process maintains, and also to programming running on the portable computer of the known person whereby, having received the report that the unidentified person absolutely is the known person, the computer then grants the known person exclusive access to use of the resources of his or her own computer. History, or any other aspect of the process may be stored in volatile or non-volatile memory, e.g., in one or more storage modules that are utilized by one or more computers.

In order to best demonstrate a few selected further utilizations of the process we will look to the future. I will utilize my co-pending patent, the Single-Point-of-Access Cyber System, to illustrate that future. I do so primarily because my Single-Point-of-Access Cyber System provides for what I find to be the full and best utilization of an accurate and reliable full spectrum cyber identification determination process.

To begin with, the Single-Point-of-Access Cyber System architecture provides each person with one remotely accessible point of cyber access computer. Each person may utilize any mobile or stationary remote terminal-type-of device that is called an "input output device" to gain secure and private access to his or her own remotely located computer.

Each person's own remotely located point of cyber access computer utilizes the process that is the subject of this patent application for determining, with 100% accuracy, that an unidentified person absolutely is the same person as the proprietary user of the computer before granting the previously unidentified person access to the personal and private resources of that person's own remotely located point of cyber access computer.

Utilizing the identification determination resources of this process, the Single-Point-of-Access Cyber System provides a technologically interconnected world with an environment that provides for the highest attainable levels of cyber security, cyber safety, and cyber privacy.

A cycle of utilization of the process is initiated by an unidentified person who utilizes any input output device to call up his or her own remotely located point of cyber access computer, and then requests access to the personal and private resources of his or her own computer. Each person's point of cyber access computer is configured to where only one specific person can gain access to personal and private resources and, only after that person has, with 100% accuracy, been determined to be the proprietary user of the computer. The computer requests that the unidentified person requesting access repeat a phrase the process has randomly selected from the first series of observations of the proprietary user of the computer.

The process may utilize any criteria for selecting the phrase to be repeated. In the instance of this cycle of the process, the phrase to be repeated was selected based upon observations from the utilized input output device in regard to light levels, light source, temperature, movement of the unidentified person, movement of the input output device, and a number of other process selected factors.

The unidentified person repeats the selected phrase for the microphone and camera of the input output device. The process, utilizing predetermined criteria, and available cyber resources, controls the operations of the microphone and the pan, tilt, and zoom modes of the camera of the input output device in order to capture the optimum observation for a second series of observations.

The process recognizes characteristics from this observation and accurately assigns designations to all recognized characteristics. The designations representing the observation and recognized characteristics are included in a second series of observations.

The designations representing the repeating of the selected phrase are then compared, utilizing the predetermined criteria of first matching the peak and valley representations of the sound of the voice from the repeating with the peak and valley graph of the voice from the proprietary user of the computer originally speaking the phrase that was repeated. Then, if a match exists, the process further compares the position of the mouth at various landmarks such as high peaks in the peak and valley graph.

In this instance, the process determines that the unidentified person requesting access absolutely is the proprietary user of the computer and the proprietary user is thereby granted exclusive access to the personal and private resources of his or her own remotely located point of cyber access computer.

I find that an interesting set of identification determination criteria must go along with a cyber environment that provides a person with secure, safe, and private access to that person's own remotely located computer and the private cyber resources within. To achieve this cyber environment, I find it necessary to utilize criteria that require a 100% accurate identification determination be made of a person before granting that person access to the resources of his or her own remotely located computer, and criteria must also be utilized that requires constant identification determination of the same person while he or she is utilizing the resources of his or her own computer in any way.

Therefore, the Single-Point-of-Access Cyber System not only requires that a person be accurately determined to be the proprietary user of a point of cyber access computer before he or she may gain access to its resources, but the Single-Point-of-Access Cyber System also requires the person utilizing the computer to constantly be determined to be the proprietary user of the computer while that person is personally using his or her own point of cyber access computer in any way.

One example of how the process may provide constant identification determinations utilizes an image of the eyes of the user of the input output device. The predetermined criteria calls for the comparing of the most current image of the eyes with the immediate prior image of the eyes at a frequency that would not allow the observed user to be changed. This method provides a weak, but accurate constant identification determination. However, for the instance of this constant cycle of utilization of the process, further predetermined criteria also calls for a full comparison and a 100% accurate identification determination to be made each time the person who is using the input output device blinks his or her eyes.

Additionally, point of cyber access computers are primarily voice operated, thereby providing the process with a vast collection of first series observations of the proprietary user of the computer when he or she is speaking So, should a person be wearing large dark glasses that prevent the use of the person's eyes for making identification determinations, then the process may utilize observations of the person's mouth for providing identification determinations. The process may also utilize the capturing of observations of the unique characteristics of the mouth at a frequency that would provide a constant determination as to whether or not the same mouth was the subject of the observation. And a 100% accurate identification determination may be provided when this person speaks, wherein the process utilizes a portion of what was said by the unidentified person in conjunction with a matching comparable observation of the proprietary user of the point of cyber access computer saying the same phrase.

Should it not be possible to utilize either of the prior strategies for providing constant identification determinations of the user of an input output device, then the process may utilize any possible aspect of an observation of the user of the input output device for persistently trying to attain a 100% accurate determination that the person using the input output device is the proprietary user of the point of cyber access computer.

A point of cyber access computer from the Single-Point-of-Access Cyber System is one single remotely accessible computer that securely and privately provides for every cyber resource the proprietary user of the point of cyber access computer could ever want or need.

At the point in the future where it is possible to utilize every cyber resource humanity could ever want or need, a person could utilize his or her own remotely located point of cyber access computer to navigate through the maze of a large open market area of an ancient and irregular part of a city in a country the person has never before been. The point of cyber access computer will utilize this cyber identification determination process to aid the proprietary user of the computer in navigating the maze.

The point of cyber access computer of the person will utilize cyber positioning resources to determine the geographic location of the person. The point of cyber access computer of the person will then utilize available public cameras from the area to first find the person from the large group of people at the market, and then accurately confirm that the found person was the proprietary user of the computer, and then, as much as is possible, provide a constant identification and location determination for the person as the person moves through the market. The previous real-time information about the location of the person, in turn, will be utilized by the computer for providing the person with the best possible aid in navigating through the maze of the busy congested market.

At times during constant observation of the person, no part of the person may be observable. However, there may be visible parts of anything that has previously been on, or about the body of the person that may be utilized by the process for visually following the movements of an otherwise unidentifiable person through the market.

This brings up another feature of this full spectrum cyber identification determination process: the feature of the process providing identification determinations not only of a person, but also providing identification determinations of any other recognizable biological observation, any recognizable non-biological observation, and any recognizable observance of the environment of an observation.

At a time when there is a cyber environment that provides every resource we could want or need, cyber resources could be utilized to observe a rock wall and through utilization of this process, the cyber resources could easily provide accurate information about the location of the wall, when the wall was built, what type of materials were used, and where the rocks originally came from.

The full spectrum cyber identification determination process-enabled, secure, safe, and private technologically interconnected environment of the Single-Point-of-Access Cyber System will provide the planet with vast new cyber resources. Among those resources will be devices that regularly monitor any selected aspect of our personal health.

The voice operated point of cyber access computer can be fully utilized through use of an input output device that is similar in size, and is worn similarly to a wristwatch. Although an input output device with an image display screen of such a small size would require intermittent use of a larger image display screen, I find a wristwatch-configured input output device to provide the greatest all-around utility. I find this, in part, because a wristwatch-configured input output device may also be utilized to securely and privately monitor and report to one's point of cyber access computer any possible health observations, both internally and externally.

A person's own point of cyber access computer may then utilize those health observations for providing that person, through use of his or her personal wristwatched-configured input output device, reports of any health information he or she may want to or need to be aware.

Through utilization of the security, safety, and privacy that is enabled by use of the full spectrum cyber identification determination process of the present disclosure, and the resources of the Single-Point-of-Access Cyber System, we will each have the ability to securely and privately provide all, or any part of our own personal and private health information to health care providers of our choice so that those health care providers may have the ability to better provide us with the best of all possible health care outcomes.

Additionally, it will be possible to anonymously provide all, or any part of our own health information to selected others for health related research.

Utilizing a wristwatch-configured input output/health monitoring device, each person may enjoy the benefits of secure and private uninterrupted observations of any number of measures of his or her health, and also, the benefits of the utilization of remote access to the full resources of his or her own remotely located point of cyber access computer.

Looking to the present again, more particularly the present need for an easy to use, versatile process that provides 100% accurate cyber identification determinations of a person, I find that prior art cyber identification measures fail to meet present needs for identification determinations because prior art does not go so far as to identify each person by means of utilizing unique biological characteristics of a person that cannot be replicated by any others. The cyber identification determination process of the present disclosure provides identification determinations of any person by utilizing unique biological characteristics of a person, unique biological characteristics that cannot be replicated by any other person or device.

The full spectrum cyber identification determination process, as utilized for providing 100% accurate cyber identification determinations of a person, utilizes as many unique biological characteristics of a person as are necessary to achieve an attainable selected identification determination goal. Many examples of unique biological characteristics of a person have previously been addressed. However, when both internal and external observations of a person are utilized in any combination, there are a very large number of possible combinations of unique biological characteristics that could be utilized for providing identification determinations of just one person. And, with every unique biological characteristic of a person that has been observed also exists one means for accurately matching an unidentified person with the identity file of a known person.

The process may provide any identification determination from a full spectrum of cyber identification determinations of not only a person, but also any other biological, non-biological, or environment observances.

Within the full spectrum of identification determinations of a person are a multitude of determinations that fall short of providing a determination that an unidentified person and a known person absolutely are the same person. For example, there are identification determinations of hair color, moles, wrinkles in skin, freckles, geometry of motion at joints, scars, height, eye color, and on and on.

There are also identification determinations of any measure of probability that might exist of a known person and an unidentified person being the same person. This type of identification determination is useful in many ways; it can be utilized to provide an indicated measure of probability that has been accomplished at any point in a cycle of the utilization of the process. And, should there be more than one person as the subject of an observation for a second series of observations, all those who are not the same person as the known person can be eliminated by utilizing an ever increasing selected minimum indicated measure of probability to quickly eliminate the majority of persons who were subjects of the observation.

The process can be utilized for determining the exact identity of an unidentified person, even when there is no knowledge of who the unidentified person might be other than the designations that represent observations of the unidentified person. For example, the process may determine who an unidentified person is by utilizing selected criteria that called for the most unique combination of recognized characteristics of the unidentified person to be utilized for searching available databases for first series of observations of known persons until either a known person was found that absolutely was the same person as the unidentified person, or there were no further database records of first series of observations of known persons from which to search.

The process also utilizes useful information from any source for providing identification determinations. Perhaps the most powerful of all information that may be utilized by the process would be information as to exactly who an unidentified person might be. If the information that the process utilizes is accurate, then a search of only one database record will provide the identity of the previously unidentified person.

Prior art cyber security measures fail to accurately control access to cyber resources because of their inability to accurately determine the exact identity of the person who is utilizing those cyber resources. The process of the present disclosure provides identification determinations from a full spectrum of cyber identification determinations as to whether a known person and an unidentified person are the same person. At one farthest end of this range is the identification determination that an unidentified person and a known person absolutely are the same person. This identification determination can be utilized to accurately grant only the known person access to his or her own personal and private cyber resources. Since unique biological characteristics of the known person were utilized for providing the identification determination, unique biological characteristics that can never be replicated by others, then all others may then be accurately excluded from ever gaining access to the cyber resources of the known person.

One of the greatest concerns of those who are skilled in the art of providing biological-based identification determinations of a person is that the utilized information comprising the cyber identity of a person may be stolen and then used fraudulently or maliciously. The full spectrum cyber identification determination process of this disclosure not only utilizes unique biological characteristics of a person that can never be replicated by others, but the process also utilizes, in many instances, a combination of a number of unique biological characteristics of a person that are observed both simultaneously, and over any measured period of time.

Once again, looking to the future of humanity's use of cyber resources, there should come a time when humanity responsibly utilizes cyber resources as a tool to regularly augment each person's own natural cognitive and observational capabilities.

In order for a person to achieve the highest attainable levels of benefits from utilization of cyber resources to augment his or her own natural capabilities, I find it will first be necessary to provide the person with a relationship of access to utilized cyber resources that is almost identical to the relationship of access the person has with his or her own mind and senses.

Therefore, I find that personal and private cyber information and resources should be configured to where they can never be accessed by anyone other than the known person. As an example, I would not want to be hypnotized for the purpose of others using information from the privacy of my mind for any reason. And I also would not want anyone to gain access to my own personal and private cyber resources and information, including my health records, financial information, geographical locating reports, cyber communications of all kinds, cyber interactions of all kinds including for commerce, education, entertainment, self-help, and so on. And just as is in the case of my own natural cognitive resources, I also would not want anyone to ever gain access to any part of my private cyber resources and information after my death. Please note, however, through use of this cyber identification determination process, as is also the case with our own natural capabilities, it will be possible to share any selected portion of our own personal and private cyber based information and resources with selected others.

Welcome to the Future!

While the disclosed process has been defined in terms of its preferred and alternative embodiments, those of ordinary skill in the art will understand that numerous other embodiments and applications of the disclosed process will become apparent. Such other embodiments and applications shall be included within the scope and meaning of the invention as defined by the appended claims.

What is claimed is:

1. A cyber identification determination process comprising:
   utilizing at least one computing device in conjunction with any cyber resources selected from all available cyber resources, and any process criteria selected from all criteria that may be utilized by said process for performing the function of providing identification determinations of a person;
   said process providing for selection of at least one of said identification determinations from a full spectrum of cyber identification determinations of said person and
   for utilizing observations of any characteristics selected from the full spectrum of useful characteristics of any subject of any process observation, said process including providing for utilizing any useful observations of any biological characteristics selected from the full spectrum of observed biological characteristics of any person being a subject of any said process observation, said full spectrum of cyber identification determinations of said person including identification determinations reporting any indicated measure selected from all indicated measures of probability that exist of an unidentified person being the same person as a known person, said determinations ranging from reporting said unidentified person absolutely is said known person, through reporting any said indicated measure of probability that exists of said unidentified person being said known person, to reporting said unidentified person absolutely is not said known person;

said process providing for utilizing any such selected useful information, said information being selected from all available useful information;

said process providing for achieving any selected attainable level of accuracy for said identification determinations, up to, and including, 100% accuracy by searching available databases for a series of observations of known persons until, either the unidentified person is absolutely identified, or there are no further database records of said first series of observations to search for comparisons;

said process providing any, selected from the range of, from said subject of any said observation not being consciously engaged in said process, to said subject of said observation being an active participant in said process; and, said process providing single identification determinations, intermittent identification determinations, and constant identification determinations, said process further providing for selection of at least one from the group of said single identification determinations, said intermittent identification determinations, and said constant identification determinations, said process further comprising utilizing all or any part of the following:

a. a first series of observations step, said process capturing, for a first series of observations, at least one observation, the subject of said observation being a known subject of said observation, said process recognizing characteristics of said subject of said observation, said process assigning designations representing said observation and said characteristics, said process including in said first series of observations said designations representing said observation and said characteristics;

b. a second series of observations step, said process capturing, for a second series of observations, at least one observation, the subject of said observation being an unidentified subject of said observation, said process recognizing characteristics of said subject of said observation, said process assigning designations representing said observation and said characteristics, said process including in said second series of observations said designations representing said observation and said characteristics;

c. a matching step, said process matching designations representing said observation and said characteristics from said second series of observations with designations representing comparable matching observations and characteristics from said first series of observations, and providing the results of said matching step;

d. a comparing step, said process comparing said designations representing said observation and said characteristics from said second series of observations with said designations representing said observation and said characteristics from said first series of observations, and providing the conclusions of said comparing step;

e. a determining step, said process utilizing either or both of said conclusions from said comparing step and said useful information for making said identification determinations; and, f. a reporting step, said process reporting on any aspect of said cyber identification process, wherein said cyber identification process, utilizing said at least one computing device, said any such selected cyber resources, said selected process criteria, said any such selected information, said any observed characteristics, and all or any part of at least one step selected from the group consisting of said first series of observations step, said second series of observations step, said matching step, said comparing step, said determining step, and said reporting step for performing the function of providing any selected from the group of said single identification determinations of, said intermittent identification determinations of, and, said constant identification determinations of said subject of said observation, said identification determinations provided at any said attainable selected level of accuracy, said identification determination selected from said full spectrum of cyber identification determinations of any selected said subject of said observation, said process further providing any selection from the range of from said subject of said observation not being consciously engaged in said process, to said subject of said observation being an active participant in said process.

2. The cyber process of claim 1 wherein said process utilizes observations of at least one unique biological characteristic from the full spectrum of unique biological characteristics of any specific person being the subject of said observations, said unique biological characteristics comprising any said biological characteristics from all said biological characteristics of said subject of said observation that can be visually, audibly, or otherwise observed;

said unique biological characteristics of a person including:
a single observed biological characteristic that is unique to said person; and,
more than one observed biological characteristic of said person that together become a unique biological characteristic of said person,
said process further including:
utilizing simultaneous observations of more than one biological characteristic of one said person; and,
utilizing observations of one or more biological characteristics of one said person that occur over any period of time,
said observations that occur over said any period of time including utilizing observed changes that occur with the movement of said person, said changes occurring with said movement of said person including any from the group of:
changes to the geometry of said person that occur with said movement;
changes to appearances of said person that occur with said movement; and,
changes to any other observed biological characteristics of said person that occur with said movement.

3. The cyber process of claim 2, wherein said changes that occur with said movement of said person include changes that occur in either or both of the face and the eyes of said person during an eyelid blink cycle, said process providing for any utilization of any observed aspect of said changes that occur in said either or both of said face and said eyes during said eyelid blink cycle of said person.

4. The cyber process of claim 1 further comprising a repeating step, said process selecting at least a portion of said first series of observations for repetition by said unidentified person, said process capturing said unidentified person performing said selection repetition, said process including in said second series of observations designations representing said selection repetition.

5. The cyber process of claim 1 wherein said process further performing the function of providing any selected cyber identification determination of any subject of any observation, said identification determinations being any from a full spectrum of identification determinations of any said subject of any said observation, said any identification determinations being utilized for any purpose.

6. The cyber process of claim 5 further comprising utilizing said process for performing the function of providing identification determinations of environment observances, said identification determinations being selected from any of a full spectrum of cyber identification determinations of environment observances.

7. The cyber process of claim 5 further comprising utilizing said process for performing the function of providing identification determinations of biological observances, said biological observances being other than said biological observances of a person, said identification determinations of said biological observances being selected from any of a full spectrum of cyber identification determinations of biological observances being other than said biological observances of said person.

8. The cyber process of claim 5 further comprising utilizing said process for performing the function of providing identification determinations of non-biological observances, said identification determinations being selected from any of a full spectrum of cyber identification determinations of non-biological observances.

9. The cyber process of claim 1 wherein any such said observations include a plurality of unidentified subjects, said process optionally performing the function of providing identification determinations of any of said plurality of said unidentified subjects, said process providing for said identification determinations being selected from a full spectrum of cyber identification determinations of any plurality of unidentified subjects of any observation.

10. The cyber process of claim 1 further comprising utilizing either or both of any such observations and any such information being derived from at least one source other than either or both of said first series of observations step and said second series of observations step.

11. The cyber process of claim 1 wherein said process providing for said observations and said information being any from a full spectrum of cyber observations and cyber information.

12. The cyber process of claim 1 wherein said process utilizes itself, said at least one computing device, said any such selected cyber resources, and said selected criteria for accurately granting and denying access to all or a portion of said cyber resources being utilized by said process.

13. The cyber process of claim 1 wherein said process utilizing itself, said at least one computing device, said any such selected cyber resources, and said selected criteria for accurately granting and denying access to all or a portion of any such cyber resources that are utilizing said process.

14. The cyber process of claim 1 wherein operations of said selected cyber resources being manipulated by said process thereby providing said process with selection of possible utilizations of said selected cyber resources.

15. The cyber process of claim 1 wherein said process further comprising altering, in any way possible, the operations of either or both of said selected cyber resources and said process, said altering for aiding in a cycle of utilizing said process resulting in attaining at least one achievable selected identification determination goal.

16. The cyber process of claim 1 wherein said process further comprises the step of maintaining a process history.

17. The cyber process of claim 1 wherein at least one observation being derived from at least one source other than said first series of observations being added to said first series of observations.

18. The cyber process of claim 1 wherein said process is scalable, said process including, at a minimum, the portion of said process necessary for providing for selected cyber identification determination needs, said process providing for cyber identification determination needs of any type or scale.

19. The cyber process of claim 1 wherein all or any part of any step of said process may be performed in any order.

20. The cyber process of claim 1 further comprising a set of standard designations for accurately and consistently representing any selected aspect of said cyber identification determination process.

* * * * *